United States Patent Office 3,843,502
Patented Oct. 22, 1974

3,843,502
PROMOTERS FOR RADIATION INDUCED CROSS-LINKING IN POLYMER SUBSTANCES
Dale S. Pearson and Anton Shurpik, Hauppauge, N.Y., assignors to The Firestone Tire & Rubber Co., Akron, Ohio
No Drawing. Filed June 1, 1971, Ser. No. 148,883
Int. Cl. B01j 1/10, 1/12
U.S. Cl. 204—159.18                            7 Claims

ABSTRACT OF THE DISCLOSURE

Process for the production of vulcanizates of diolefin rubbers by irradiation of compositions containing such rubbers utilizing polyhydrosulfides such as 1,10-dimercaptodecane as direct promoters. Indirect promoters may also be used to lower the total dose requirements.

BACKGROUND OF THE INVENTION

This invention relates to the irradiation vulcanization of vulcanizable rubbers utilizing polyhydrosulfides as cross-linking agents. More particularly, it relates to new and improved processes for the vulcanization of diolefin rubbers in the presence of polyhydrosulfides using high energy ionizing radiation. It relates also to the novel vulcanizable compositions and to the vulcanizates produced.

Efforts are continually being made to improve the properties of natural and synthetic rubbers. New rubbers are produced containing a variety of accelerators, antioxidants, vulcanizing agents and other additives. Attempts have been made to utilize high energy particle irradiation to improve the properties of various rubbers and other polymers both with and without additives. These attempts have not been successful because some rubbers degrade when subjected to irradiation and others, although somewhat improved in properties, require such a high dose to acquire even minimum beneficial results that the process is generally not economically attractive.

THE INVENTION

A process has now been discovered for the vulcanization of uncured rubbers whether obtained by solution or emulsion polymerization to produce vulcanizates of improved properties by radiation vulcanization, and to do so at dose levels consistent with good economic practice.

The process of the invention is particularly useful for natural and synthetic diolefin rubbers, a well known class of rubbers including, for example, polybutadienes, polyisoprenes, various copolymers of conjugated diolefins and vinyl compounds such as SBR (copolymer of butadiene and styrene) and NBR (copolymer of butadiene and acrylonitrile), copolymers of butadiene or isoprene with alpha-methylstyrene, ring-substituted styrenes, chloromethyl styrene, etc., butadiene-isoprene copolymer, isobutylene-isoprene, isobutylene-cyclopentadiene, vinyl pyridines, ethylene-propylene terpolymers, etc. The invention is also applicable to rubber blends such as natural rubber and SBR, natural rubber and polybutadiene, SBR and polybutadiene. These blends may additionally contain butyl or chlorobutyl rubbers. The application of radiation techniques to these last mentioned rubbers is a particuler feature of this invention which will be discussed in more detail hereinafter.

Any of a wide variety of polyhydrosulfides which have two or more sulfhydryl groups and are miscible with the unvulcanized rubbers are useful in the practice of this invention. Suitably, the polyhydrosulfide will have a molecular weight in the range from about 94 to 500. Typically useful compounds include 1,2-ethane dithiol, 1,3-propanedithiol, tetra methylenedithiol, hexamethylene dithiol, the cyclohexane dithiols, 2,3-dimercaptopropanol-1, α,α-dimercaptoxylene, ortho-, meta-, and paraphenylene dithiols, 1,10-dimercaptodecane, ethylene glycol dimercaptoacetate, dipentene dimercaptan, 2,2-diphenyl-1,3-propanediol dithioglycolate and trimethylolpropane trithioglycolate. Ethylene glycol dimercaptoacetate and trimethylolpropane trithioglycolate are especially preferred species because they have good reactivity at relatively low doses, their odor is not offensive, and they produce excellent products.

Other useful species include those in which the organic polyhydrosulfide is an aryl or alkyl polymercaptan having from about 2 to 20 carbon atoms per molecule. Especially preferred are alkyl dimercaptans having two to ten carbon atoms per molecule.

It will be noted that the polyhydrosulfides utilized in the invention may have other functional groups present, including, for example, carboxyl, nitrile, hydroxyl, and other functional groups which do not interfere with the reaction. This is a special advantage of the invention since it affords the opportunity of producing a wide variety of vulcanized rubbers having chemical or physical properties which make them useful for special purposes. For example, automotive tires constructed of rubbers prepared in accordance with the invention utilizing polyhydrosulfides with carboxyl groups on the molecule as the cross-linking or curing agent have improved anti-skidding properties, especially on wet surfaces. Additionally, the presence of other functional groups offers the opportunity for further chemical reaction of the vulcanized rubber.

The polyhydrosulfides utilized in this invention appear to function as cross-linking agents, that is the vulcanization is effected by the formation of crosslinks joining adjacent linear chains of the unvulcanized rubber together. In this sense they are direct promoters of vulcanization. The products formed therefore, are characterized by the presence of both carbon-carbon and carbon-sulfur crosslinks.

In an especially preferred aspect of this invention certain selected indirect promoters are added to the composition to be vulcanized. Para dichlorobenzene is a preferred indirect promoter. Others include ortho-, and meta-dichlorobenzene, ortho-, meta- and paradibromobenzene, ortho-, meta- and paradifluorobenzene, bromobenzene, chlorobenzene, chlorotoluenes; mono- or poly-chlorinated biphenyls, dichloronaphthalenes, chloroform, carbon tetrachloride, carbon tetrabromide, hexachloroethane, 1,2-dichloro-4-t-butylbenzene, t-butyl chloride, cyclohexyl bromide, α-chlorotoluene, and α,α'-dichloroxylene.

It has been found that the crosslink density which may be obtained utilizing both direct and indirect promoters is greater than would be predicted on the basis of the cross-link density which can be attained using either one of them alone. In other words, a synergistic effect which was totally unexpected has been observed. This effect will be illustrated in the examples. The use of both types of promoters permits a decrease in the total irradiation dose required to achieve the improved properties. Alternatively, the concentration of direct promoter can be lowered without adversely affecting the results achievable at a specific dose level. The ultimate result is that the cost of the process is lessened.

Indirect promoters are a class of compounds well known in the field of radiation. They have been widely employed to improve the effects of high energy ionizing radiation in the production of various products, particularly cross-linked, high molecular weight polymers and copolymers. They are generally low molecular weight aliphatic and aromatic compounds containing chlorine, bromine, fluorine or iodine in addition to carbon and hydrogen up to a total of about ten carbon atoms.

The vulcanizable compositions of this invention comprise uncured, diolefin rubbers having an average molecular weight of from about 100,000 to 500,000 containing from about 0.1 to 5%, based on the total weight, of at least one polyhydrosulfide direct vulcanization promoter. They may also contain from about 0.1 to 5% by weight of an indirect promoter.

A highly preferred direct promoter is 1,10-dimercaptodecane, and the dichlorobenzenes are excellent indirect promoters. When used in combination, these promoters provide excellent products at relatively low dose.

The diolefin rubber vulcanizates of the invention comprise diolefin rubbers containing molecular segments, generally linear, which are cross-linked with the internal polyhydrosulfide vulcanization promoters. The average molecular weight of the cross-linked segments is from about 100,000 to 500,000.

A most unusual and highly important aspect of this invention is the discovery that it is applicable to the vulcanization of copolymers of isoprene and isobutylene containing from about 0.3 to 3 mole percent of the former. It is also applicable to the vulcanization of chlorobutyl rubbers, which are derivatives of butyl rubber formed by chlorination of this substrate. Butyl rubbers have not previously been successfully converted to useful products by radiation techniques. In fact, such attempts as have been made at radiation vulcanization of these rubbers have led to degradation and loss of useful properties rather than vulcanization and improvement of properties. The synergistic effect discussed above has not been observed with chlorobutyl rubber. The rate of vulcanization decreases with the addition of an indirect promoter.

The desired vulcanization can be accomplished in accordance with this invention by subjecting the selected composition to an adequate dose of high energy particle irradiation. The technique serves to effect vulcanization and thereby achieve the desired objects. The radiation can be carried out by passing the composition, suitably in the form of a thin layer of from about 0.05 to 0.25 inches in thickness through a beam of high energy electrons under conditions that will give a high energy dose of from 0.1 to 15 Mrads. Such a dose is sufficient to effect any desired degree of vulcanization from a relatively flexible rubber product to a hard rubber product. In general, doses of from 1 to 5 Mrads are preferred. Typically the dose rate is from about 0.02 to 5 Mrad/sec. although appreciable variation is possible. Thicker layers of rubber, for example up to about 0.5 inches in thickness, can be treated by two passes through the beam, first on one side and then on the other.

Various dose rates can be achieved from conventional radiation equipment by techniques known in the art. For example, the desired amount of radiation can be obtained using a 300 kev. electron accelerator which emits a circular beam of electrons from a heated cathode filament. The electrons are guided through a scanning magnet and emerge through a thin titanium window which is approximately 1 by 24 inches. A beam power of 3 kw. is obtained at an operating current of 10 mamps. The dose delivered can be measured using the well-known blue cellophane technique. See Henley and Richman; Anal. Chem. 28, 1580 (1956). By altering the beam current, beam diameter and distance to the source, various dose rates can be obtained.

In practicing the invention, the rubber to be vulcanized is compounded in the usual way which will, of course, vary with the end use of the vulcanized product. If the rubber is to be used in tire construction it may contain reclaim rubber, oil, vulcanization accelerators, antioxidants, tackifiers and plasticizers, and carbon black. If it is intended for the preparation of hard rubber casing it may contain plasticizer, reclaim rubber and hard rubber dust. It is a special feature of this invention that the compositions containing the vulcanizable rubber be prepared in accordance with standard procedures normally employed for the compounding of rubber compositions intended to be vulcanized in the usual manner. Polyhydrosulfide is added to the composition together with the indirect promoter, if desired, and the compositions converted to a suitable form for radiation. If one or more polyhydrosulfides are employed the concentration may vary from about 0.1 to 5%, by weight, based on the total weight. The preferred concentration is from 0.25 to 1.5% since suitable products can be obtained without significant increase in cost. With rubber blends the concentration of promoter will generally be closer to 5% if no indirect promoter is used, e.g. 3.5% to 5%.

Indirect promoters, if employed, will normally be utilized at a concentration of from about 0.1% to 5% by weight based on the total weight. By using such indirect promoters it may be possible to operate at a decreased dose level or decreased direct promoter, or both. The actual amount of each type of promoter utilized therefore, is a matter of choice depending upon the desired result.

Generally speaking, the stress-strain properties of the vulcanized product appear to improve with increasing dose and decreasing concentration of direct promoter, at least at the lower concentrations and lower doses.

It is known to polymerize liquid polymers using polyhydrosulfide promoters. However, these are liquid polymers of relatively low molecular weight, whereas the diolefin rubber polymers which are the subject of this invention are of high molecular weight, i.e., 100,000 to 500,000. It has been discovered, as explained above, that the concentration of polyhydrosulfide utilized to effect vulcanization in accordance with this invention is very low. Preferred concentrations are of the order of from 0.25 to 1.5% by weight. In fact, concentrations much higher than this, for example in the range of from 1 to 10 mole percent or 2 to 20% by weight, are generally detrimental to the uncured rubbers to which this invention is applicable since the vulcanized rubers produced even at low total doses are no longer pliable and tough, but rather they are hard and brittle. The useful elastomeric properties of the rubber are lost.

A very important commercial advantage of the process of this invention is that the rate of vulcanization is substantially increased compared with conventional processes. This is an important consideration for industrial operations where many tons of rubber compounds must be processed. Such huge quantities can only be processed economically if it can be done at a high rate of speed. Another advantage is that it can be utilized with both solution and emulsion polymerized rubbers to lower the dose requirements for the economic production of useful products. This invention makes it possible for the first time to effect curing or vulcanization of rubber on a commercial scale by radiation techniques.

The following non-limiting examples are given by way of illustration only.

Examples 1–3

The mixtures shown in Tables 1, 2 and 3 were mixed in a Brabender blender to form a homogeneous mix. The mix was rolled on a mill at 75° C. to form a thin film approximately 25 mils thick. Sections of the film were stacked in a platen press and formed into samples 6 inches by 6 inches which were about 75 mils thick at a temperature of 100° C. and a pressure of 8000 p.s.i. on the ram. Irradiation was effected by subjecting the samples to the electron beam of a 1.5 mev. electron accelerator.

Stereon 700 is a copolymer of butadiene (80%) and styrene (20%) with a number average molecular weight of about 120,000.

Diene 55 is a polybutadiene with a number average molecular weight of about 180,000.

HAF is a high abrasion furnace black.

Arochlor 1242 is a chlorinated biphenyl.

TABLE 1

Stereon 700, 100 parts
HAF, 50 parts

| Dose | 8 | 5 | 3 |
|---|---|---|---|
| Modulus (p.s.i.) | 1,175 | 1,225 | 1,215 |
| Tensile (p.s.i.) | 2,664 | 2,925 | 2,535 |
| Elongation (percent) | 600 | 590 | 540 |
| Trimethylolpropane-trithioglycolate (phr.) | 0 | 0.5 | 0.5 |
| Arochlor 1242 (phr.) | 0 | 0 | 3.5 |

NOTE.—These data show that it is possible to lower the radiation dose to achieve substantially the same ultimate properties by the addition of a direct promoter and to lower it still more by the further addition of an indirect promoter.

TABLE 2

Stereon 700, 100 parts
HAF black, 50 parts
p-Dichlorobenzene, 2 parts

| Dose (Mrad) | 1 | 1 | 2 |
|---|---|---|---|
| Modulus (p.s.i.) | Overcured | 1,587 | 1,755 |
| Tensile (p.s.i.) | Overcured | 2,550 | 2,850 |
| Elongation (percent) | Overcured | 455 | 435 |
| Dimercaptodecane (phr.) | 3 | 1 | 0.5 |

NOTE.—These data show the improvement in properties of the cured rubber upon lowering of the concentration of dithiol.

TABLE 3

Diene 55, 100 parts
HAF black, 50 parts
p-Dichlorobenzene, 2 parts

| Dose (Mrads) | 0.5 | 0.5 | 0.5 |
|---|---|---|---|
| Modulus (p.s.i.) | Overcured | 1,040 | 1,063 |
| Tensile (p.s.i.) | Overcured | 1,340 | 1,785 |
| Elongation (percent) | Overcured | 350 | 450 |
| Dimercaptodecane (phr.) | 3 | 1 | 0.5 |

NOTE.—These data show the continued improvement in the properties of the cured rubber by successive decreases in dithiol concentration. A still lower concentration than 0.5 phr. results in further improved properties.

Example 4

The ingredients listed in Table 4 were compounded and treated as in Examples 1-3 with the listed results.

Chlorobutyl HT 1068 is a chlorinated butyl rubber with a weight average molecular weight of about 350,000 to 400,000 a mole percent of isoprene of from 1.1 to 1.7 and a weight percent of chlorine of from 1.1 to 1.3.

TABLE 4

Chlorobutyl HT 1068, 100 parts
HAF black, 50 parts

| | Dose (Mrads) | | |
|---|---|---|---|
| | 6 | 4 | 5 |
| 300% modulus (p.s.i.) | 334 | 351 | 369 |
| Tensile (p.s.i.) | 1,085 | 1,250 | 1,275 |
| Elongation (percent) | 725 | 740 | 725 |
| Trimethylol propane trithioglycolate (phr.) | 0 | 3 | 3 |
| Arochlor 1242 (phr.) | 0 | 0 | 5.2 |

NOTE.—These data show that chlorobutyl rubber can be vulcanized by radiation and that the dose can be lowered while attaining substantially the same properties by the addition of a direct promoter. It will be noted that the addition of an indirect promoter causes an increase in the required dose.

Example 5

A blend containing the following ingredients was compounded and treated as in the previous examples.

Ingredients: Parts per hundred rubber
- Stereon 700 ........ 50
- Diene 35 ........ 25
- Select A (Natural Rubber) ........ 25
- Flexon 765 Oil ........ 20
- HAF Black ........ 60
- p-Dichlorobenzene ........ 2

Diene 35 is a polybutadiene with a number average molecular weight of about 110,000.

Flexon 765 is a naphthenic petroleum oil.

The results are shown in Table 5.

TABLE 5

| | Dose (Mrads) | |
|---|---|---|
| | 6 | 3 |
| 300% modulus (p.s.i.) | 757 | 731 |
| Tensile (p.s.i.) | 1,967 | 1,871 |
| Elongation (percent) | 550 | 550 |
| 1,10-dimercaptodecane (percent) | 0 | 0.40 |

NOTE.—It is apparent that the addition of the direct promoter halve the radiation dose necessary to obtain substantially the same properties

What is claimed is:

1. A process for the radiation vulcanization of diolefin rubbers which comprises subjecting an unvulcanized composiiton of said diolefin rubber in which the average molecular weight is from about 100,000 to 500,000 containing from about 0.1 to 5% by weight of an organic polyhydrosulfide direct vulcanization promoter, and from about 0.1 to 5% by weight of an indirect vulcanization promoter, said indirect vulcanization promoter being a low molecular weight halogenated aliphatic or aromatic hydrocarbon containing up to about ten carbon atoms, the percent by weight of both promoters being based on the total weight, to high energy ionizing radiation at a total dose of from about 0.1 to 15 Mrads.

2. A process as in Claim 1 wherein the total dose is from 1 to 5 Mrads.

3. A process for the radiation vulcanization of diolefin rubbers which comprises subjecting an unvulcanized composition of said diolefin rubber in which the average molecular weight is from about 100,000 to 500,000 containing from about 0.1 to 5% by weight of an organic polyhydrosulfide direct vulcanization promoter, and from about 0.1 to 5% by weight of an indirect vulcanization promoter, said indirect vulcanization promoter being a low molecular weight halogenated aliphatic or aromatic hydrocarbon containing up to about ten carbon atoms selected from the group consisting of Para dichlorobenzene, ortho-, and meta-dichlorobenzene, ortho-, meta- and paradibromobenzene, ortho-, meta- and para difluorobenzene, bromobenzene, chlorobenzene, chlorotoluenes; mono- or poly-chlorinated biphenyls, dichloronaphthalenes, chloroform, carbon tetrachloride, carbon tetrabromide, hexachloroethane, 1,2-dichloro-4-butylbenzene, t-butyl chloride, cyclohexyl bromide, $\alpha$-chlorotoluene, and $\alpha,\alpha'$ dichloroxylene, the percent by weight of both promoters being based on the total weight, to high energy ionizing radiation at a total dose of from about 0.1 to 15 Mrads.

4. A process as in Claim 1 wherein the concentration of organic polyhydrosulfide is from 0.25 to 1.5%.

5. A process as in Claim 1 wherein the direct promoter is 1,10-dimercaptodecane, ethylene glycol dimercapto acetate or trimethylolpropane dithioglycolate.

6. A process as in Claim 1 wherein the direct promoter is 1,10-dimercaptodecane and the indirect promoter is a dichlorobenzene.

7. A process as in Claim 1 wherein the direct promoter is trimethylolpropane dithioglycolate and the indirect promoter is chlorinated biphenyl.

References Cited

UNITED STATES PATENTS

| 3,274,142 | 9/1966 | Warner | 260—30.2 |
| 3,697,397 | 10/1972 | Kehr et al. | 204—159.14 |
| 3,338,810 | 8/1967 | Warner | 204—159.18 |
| 2,921,006 | 1/1960 | Schmitz et al. | 204—159.15 |
| 3,661,744 | 5/1972 | Kehr et al. | 204—159.14 |

MURRAY TILLMAN, Primary Examiner

R. B. TURER, Assistant Examiner

U.S. Cl. X.R.

260—33.6 AQ, 44.5 R, 79.5 R, B, C, A, 888, 894